(12) United States Patent
Yamanaka

(10) Patent No.: US 10,090,931 B2
(45) Date of Patent: Oct. 2, 2018

(54) OPTICAL TRANSMITTER

(71) Applicant: SUMITOMO ELECTRIC INDUSTRIES, LTD., Osaka-shi, Osaka (JP)

(72) Inventor: Shingo Yamanaka, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/375,796

(22) Filed: Dec. 12, 2016

(65) Prior Publication Data

US 2017/0187464 A1    Jun. 29, 2017

(30) Foreign Application Priority Data

Dec. 24, 2015  (JP) ................................. 2015-252178

(51) Int. Cl.
    *H04B 10/54*    (2013.01)
    *H04B 10/564*   (2013.01)

(52) U.S. Cl.
    CPC ......... *H04B 10/541* (2013.01); *H04B 10/564* (2013.01)

(58) Field of Classification Search
    CPC .............................. H04B 10/54; H04B 10/564
    See application file for complete search history.

(56) References Cited

U.S. PATENT DOCUMENTS

| 9,197,318 B1* | 11/2015 | Mosinskis | H04B 10/564 |
| 2002/0027690 A1* | 3/2002 | Bartur | H04B 10/504 |
| | | | 398/139 |
| 2007/0177882 A1 | 8/2007 | Akiyama | |
| 2008/0238637 A1* | 10/2008 | Ghabra | B60R 25/24 |
| | | | 340/426.36 |
| 2008/0265132 A1 | 10/2008 | Ishikawa | |
| 2009/0214198 A1* | 8/2009 | Takahashi | H01S 5/06825 |
| | | | 398/1 |
| 2013/0084065 A1* | 4/2013 | Ishii | H04B 10/505 |
| | | | 398/38 |
| 2014/0212136 A1 | 7/2014 | Akiyama et al. | |

FOREIGN PATENT DOCUMENTS

| JP | 2007-208472 A | 8/2007 |
| JP | 2008-278200 A | 11/2008 |
| JP | 2014-150371 A | 8/2014 |

* cited by examiner

*Primary Examiner* — Nathan Cors
(74) *Attorney, Agent, or Firm* — Global IP Counselors, LLP

(57) ABSTRACT

An optical transmitter including a signal processor, a driver, a current detector, an amplitude detector, and a controller is disclosed. The signal processor outputs a modulation signal that has first amplitude. The driver amplifies the modulation signal for generating a driving signal that has second amplitude. The current detector detects a supply current that the driver consumes for the amplification. The amplitude detector detects the second amplitude of the driving signal. The controller keeps the driver based at least in part on the supply current detected by the current detector for maintaining the supply current of the driver in a first target value. The controller varies the first amplitude of the modulation signal based at least in part on the second amplitude of the driving signal detected by the amplitude detector for maintaining the second amplitude of the driving signal in a second target value.

14 Claims, 12 Drawing Sheets

OPTICAL TRANSMITTER

CROSS-REFERENCE TO RELATED APPLICATIONS

This U.S. National stage application claims priority under 35 U.S.C. § 119(a) to Japanese Patent Application No. 2015-252178, filed in Japan on Dec. 24, 2015, the entire contents of which are hereby incorporated herein by reference.

BACKGROUND OF THE INVENTION

1. Field of the Invention

The present invention relates to an optical transmitter.

2. Related Background Arts

Digital coherent transmission technology, which utilizes phase information of light wave, has been implemented for increasing capacity of communication network. The digital coherent transmission technology applies modulation systems like DP-QPSK (Dual Polarization—Quadrature Phase Shift Keying) and DP-16QAM (Dual Polarization—16 Quadrature Amplitude Modulation) to enable a transmission speed beyond 100 Gbps per wavelength. The QPSK system utilizes quadrature phases of an optical carrier wave for modulation and demodulation, and the QAM system further utilizes multi-levels in amplitude of the optical carrier wave for higher speed modulation and demodulation. The QPSK system and 16QAM system respectively treats four and sixteen symbols in constellation diagram thereof. The DP multiplexing technique utilizes two polarized optical carrier waves, which are orthogonal to each other, for multiplexing the modulated optical signals by the QPSK system or QAM system.

Some optical transceivers (coherent optical transceiver) which perform such phase modulations/demodulations and the polarization multiplexing are being developed. Each coherent optical transceiver mostly includes a transmission part (optical transmitter) and reception part (optical receiver). The transmission part includes a multi-level phase modulator and a driving circuit (driver). The multi-level phase modulator has a nested structure constituted by a plurality of Mach-Zhender modulators. The driving circuit generates driving signals to drive the Mach-Zhender modulators for the QPSK system or QAM system.

SUMMARY OF THE INVENTION

One aspect of the present invention relates to an optical transmitter that includes a signal processor, a driver, a current detector, an amplitude detector, and a controller. The signal processor outputs a modulation signal that has first amplitude. The driver amplifies the modulation signal for generating a driving signal that has second amplitude. The current detector detects a supply current that the driver consumes for amplification. The amplitude detector detects the second amplitude of the driving signal. The controller controls the driver based at least in part on the supply current detected by the current detector for adjusting the supply current of the driver to a first target value. The controller varies the first amplitude of the modulation signal based at least in part on the second amplitude detected by the amplitude detector for adjusting the second amplitude of the driving signal to a second target value.

Another aspect of the present invention relates to a control method for an optical transmitter including a signal processor and a driver. The signal processor is configured to generate a modulation signal having first amplitude. The driver is configured to amplify the modulation signal for generating a driving signal having second amplitude. The control method including detecting a supply current of the driver for outputting a detected current value, controlling the driver for adjusting the detected current value to a first target value, detecting the second amplitude of the driving signal for outputting a detected amplitude value, and controlling the signal processor for adjusting the detected amplitude value to a second target value.

DESCRIPTION OF EMBODIMENT

Some examples of an optical transmitter according to embodiment of the present invention will be described with referring to accompanying drawings. In the description of the drawings, numerals and symbols same with or similar to each other will refer to elements same with or similar to each other without duplicating descriptions. Also, the present invention is not restricted to those drawings and will cover all substances, changes, and equivalents fallen within a scope of claims and equivalents thereof.

First Embodiment

Figure 1:
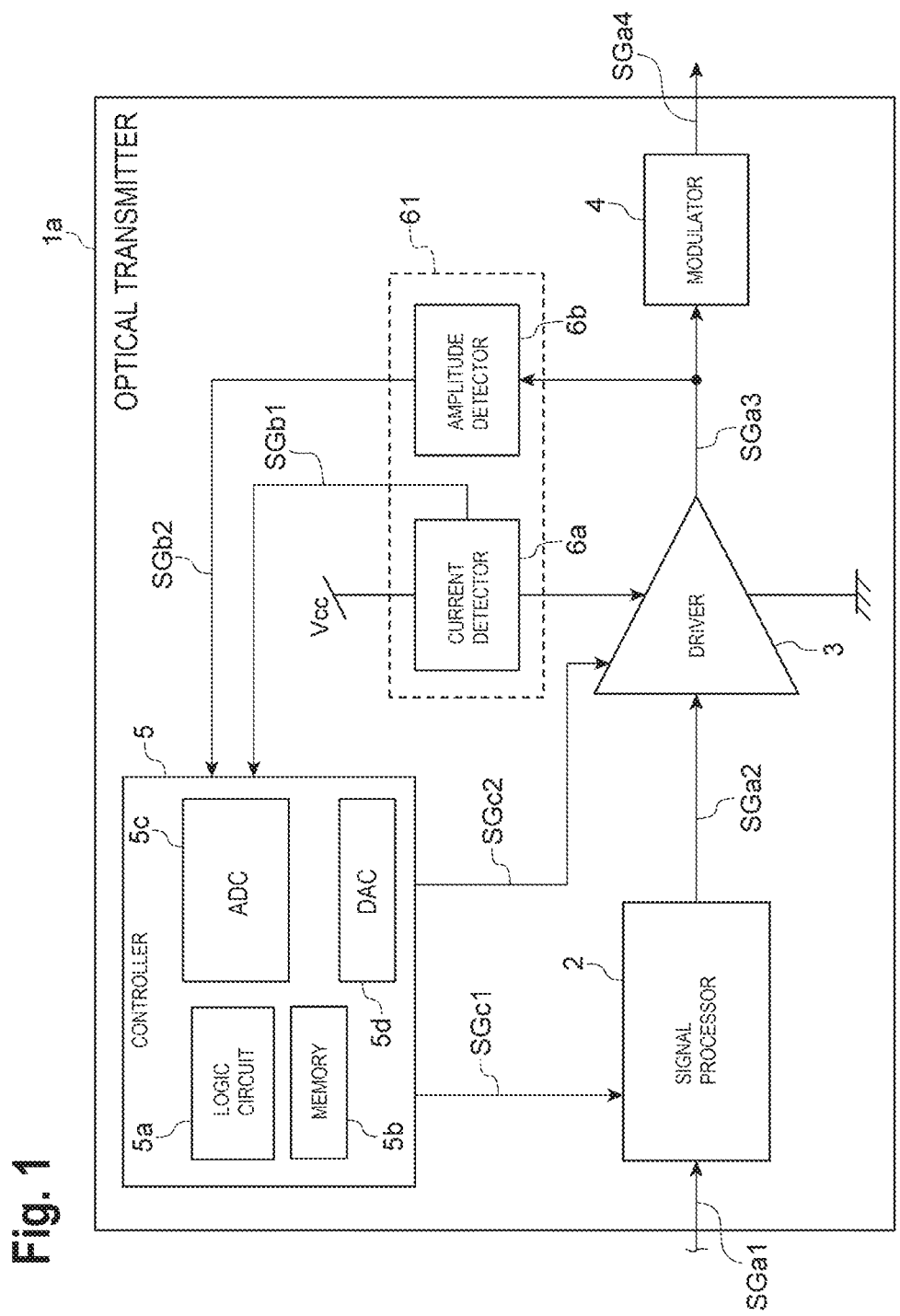
FIG. 1 is a diagram which schematically shows a configuration of an optical transmitter according to a first embodiment of the present invention.

FIG. 1 is a diagram which schematically shows a configuration of an optical transmitter 1a according to a first embodiment of the present invention. The optical transmitter 1a may be used in a coherent optical transceiver that performs a multi-level phase modulation like the DP-QPSK system or the DP-16QAM system. The optical transmitter 1a includes a signal processing circuit 2 (signal processor), a driving circuit 3 (driver), optical modulator 4 (modulator), a control circuit 5 (controller), and a detection circuit 61. The controller 5 includes a logic circuit 5a, a memory 5b, an ADC 5c (Analog-to-Digital Converter), and a DAC 5d (Digital-to-Analog Converter). The detection circuit 61 includes a supply current detector 6a (current detector) and an amplitude detector 6b. Although the configuration shown in FIG. 1 includes only one driver 3 and one detection circuit 61, the configuration of the optical transmitter 1a may include a plurality of drivers 3 and a plurality of detection circuits 61. In that case, the drivers 3 are connected in parallel between the signal processor 2 and the modulator 4. The signal processor 2 may provide a plurality of modulation signals to the drivers 3. Each driver 3 may provide a driving signal to a Mach-Zhender modulator in the modulator 4. The drivers 3 may be coupled with the detection circuits 61 one by one. Each detection circuit 61 may provide detection signals thereof SGb1 and SGb2 to the controller 5.

As shown in FIG. 1, the signal processor 2 is electrically connected to the driving circuit 3 and controller 5. The signal processor 2 may receive an electrical input signal SGa1 (transmission signal) from an outside, and outputs a modulation signal SGa2 in accordance with the electrical input signal SGa1. The signal processor 2 may receive an amplitude control signal SGc1 from the controller 5. The modulation signal SGa2 may be a differential signal or a single-ended signal. The modulation signal SGa2 has amplitude Vinpp [V] (first amplitude). The signal processor 2 may vary the first amplitude Vinpp [V] of the modulation signal SGa2 in accordance with the amplitude control signal SGc1, independently of the electrical input signal SGa1. The signal processor 2 consumes power dissipation, which becomes almost constant when the signal processor 2 may vary the first amplitude Vinpp of the modulation signal SGa2 in accordance with the amplitude control signal SGc1.

The driver 3 is electrically and individually connected to the signal processor 2, the modulator 4, the controller 5, the current detector 6a, and the amplitude detector 6b. The driver 3 is arranged between the signal processor 2 and the modulator 4. The driver 3 may receive the modulation signal SGa2 from the signal processor 2. The driver 3 may amplify the modulation signal SGa2 by voltage gain Av, for generating a driving signal SGa3. The driver 3 may output the driving signal SGa3 to drive the modulator 4. The driving signal SGa3 has amplitude Voutpp (second amplitude). The driving signal SGa3 may be also provided to the amplitude detector 6b for detecting the second amplitude Voutpp of the driving signal SGa3.

The driver 3 is electrically connected to a power supply Vcc through the current detector 6a. A supply current Ec flows from the power supply Vcc into the driver 3. The current detector 6a may detect magnitude of the supply current Ec flowing into the driver 3. The driver 3 consumes the supply current Ec for generating and outputting the driving signal SGa3. The driver 3 may receive a gain control signal SGc2 from the controller 5. The driver 3 may vary the voltage gain Av in accordance with the gain control signal SGc2, for varying the second amplitude Voutpp. The driver 3 may amplify the modulation signal SGa2 for generating the driving signal SGa3. The relationship between the first amplitude Vinpp of the modulation signal SGa2 and the second amplitude Voutpp of the driving signal SGa3 is expressed by a formula Voutpp=Vinpp×Av. Accordingly, increase in the voltage gain Av causes increase in the second amplitude Voutpp, and increase in the first amplitude Vinpp also causes increase in the second amplitude Voutpp.

Note that the supply current Ec depends on the gain control signal SGc2. Specifically, increase in the voltage gain Av causes increase in the supply current Ec and decrease in the voltage gain Av causes decrease in the supply current Ec. Accordingly, the gain control signal SGc2 may be utilized for varying the supply current Ec. The driver 3 consumes a power dissipation Pd, which is calculated by a formula Pd=Ec×Vt, where Vt is a supply voltage that the driver 3 receives from the power supply Vcc through the current detector 6a. In the following description of the first embodiment, the supply voltage Vt is assumed to be kept constant. Therefore, increase in the voltage gain Av causes increase in the power dissipation Pd, and decrease in the voltage gain Av causes decrease in the power dissipation Pd. Accordingly, the gain control signal SGc2 may vary not only the voltage gain Av but also the supply current Ec.

The optical modulator 4 (modulator) is a multi-level phase modulator for coherent transmission, for example, including a plurality of Mach-Zehnder modulators. The modulator 4 is electrically connected to the driver 3. The modulator 4 may receive the driving signal SGa3 from the driver 3. The modulator 4 is optically connected to a light source (not drawn), for example, a laser that emits CW (Continuous Wave) light. The light source provides CW light to the modulator 4. The modulator 4 may modulate the CW light in accordance with the driving signal SGa3 for generating an optical signal SGa4. The optical transmitter 1a may output the optical signal SGa4 to an external optical waveguide, for example, an optical fiber cable.

The controller 5 is electrically connected to the signal processor 2, the driver 3, and the detection circuit 61. The controller 5 includes the logic circuit 5a and the memory 5b. The logic circuit 5a is for example a CPU (Central Processing Unit). The memory 5b is for example a ROM (Read Only Memory) and a RAM (Random-Access Memory). The logic circuit 5a executes a computer program that the memory stores, for controlling the signal processor 2 and the driver 3 based at least in part on a plurality of detection results by the detection circuit 61 and a plurality of target values stored in the memory 5b. The target values are for example a first target value Ti for the supply current Ec and a second target value Tv for the second amplitude Voutpp.

The ADC 5c may receive the detection results, for example, analog signals SGb1 and SGb2 (current detection signal and amplitude detection signal, respectively) from the detection circuit 61, and convert the analog signals SGb1 and SGb2 into respective digital data for logic operation by the logic circuit 5a and storing in the memory 5b. The logic circuit 5a may generate amplitude control data and gain control data based at least in part on the digital data and the target values thereof. The DAC 5d respectively may convert the amplitude control data and the gain control data into the amplitude control signal SGc1 and the gain control signal SGc2. The amplitude control signal SGc1 may be provided to the signal processor 2 for varying the first amplitude Vinpp. The gain control signal may be provided to the driver 3 for varying the voltage gain Av. The controller 5 may control the signal processor 2 and the driver 3 by using the amplitude control signal SGc1 and the gain control signal SGc2 so that the supply current Ec becomes substantially equal to the first target value Ti and the second amplitude Voutpp becomes substantially equal to the second target value Tv.

More specifically, the controller 5 may generate the gain control signal SGc2 so as to reduce difference in value between the supply current Ec detected by the current detector 6a and the first target value Ti stored in the memory 5b, and simultaneously generate the amplitude control signal SGc1 so as to reduce difference in value between the second amplitude Voutpp detected by the amplitude detector 6b and the second target value Tv stored in the memory 5b. In other words, the controller 5 may adjust the supply current Ec consumed by the driver 3 to the first target value Ti [A], and adjust the second amplitude Voutpp detected by the amplitude detector 6b to the second target value Tv.

Figure 2:
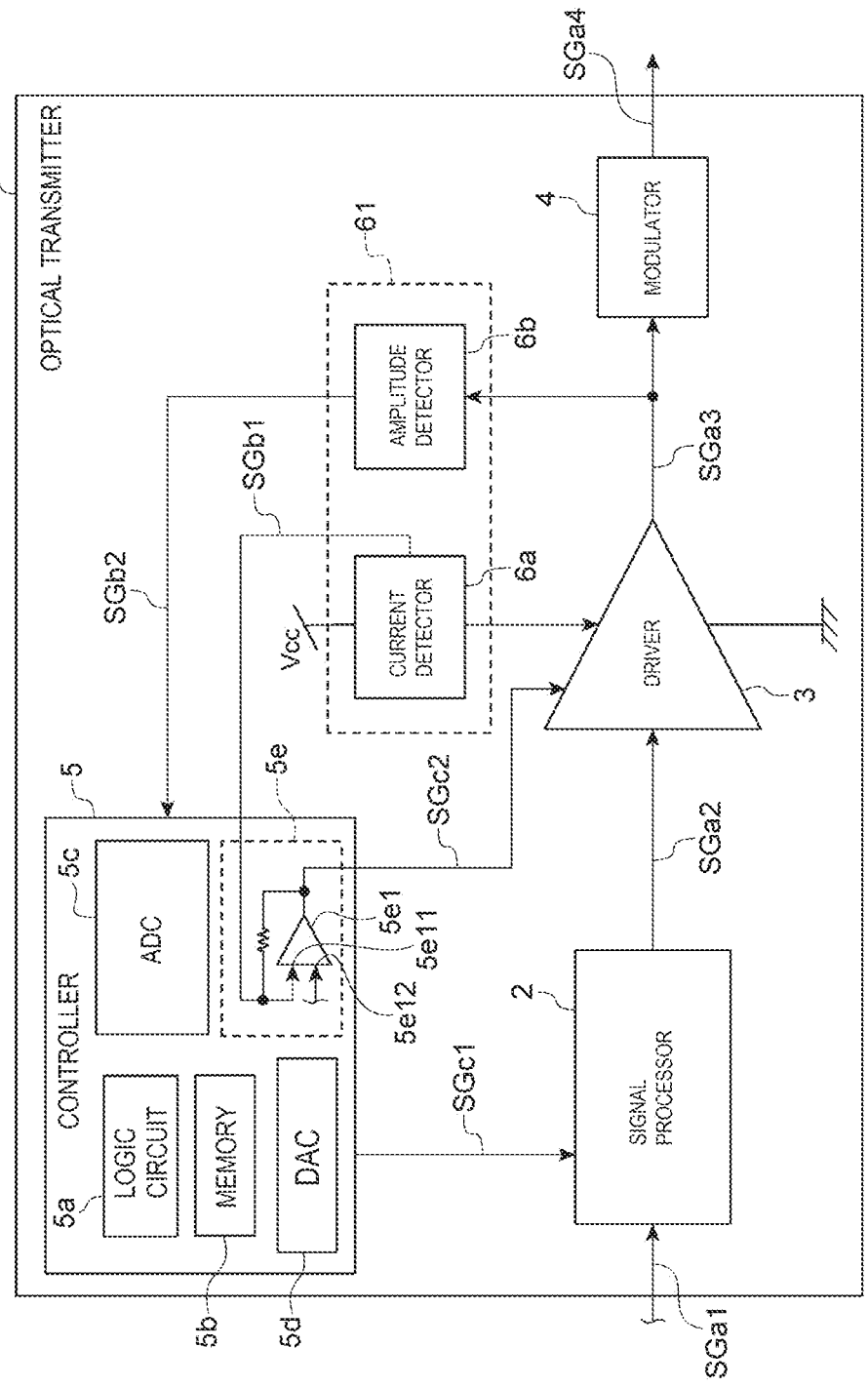
FIG. 2 is a diagram which shows a variation of the configuration of the optical transmitter according to the first embodiment of the present invention.

FIG. 2 is a diagram which shows a variation of the configuration of the optical transmitter according to the first embodiment of the present invention. As shown in FIG. 2, the controller 5 includes a gain control circuit 5e. The gain control circuit 5e may generate the gain control signal SGc2 based at least in part on the current detection signal SGb1 and the first target value Ti on behalf of the logic circuit 5a. The gain control circuit 5e includes an operational amplifier 5e1, which may receive the current detection signal SGb1 from the current detector 6a and receive the first target value Ti from the memory 5b. The operational amplifier 5e1 may generate the gain control signal SGc2 so that the supply current Ec becomes equal to the first target value Ti. The gain control signal SGc2 may vary in response to difference in value between the supply current Ec and the first target value Ti.

Referring back to FIG. 1, the detection circuit is described. The detection circuit 61 may detect some physical quantities relating to operation of the driver 3 and provide some detection signals to the controller 5 as detection results. More specifically, the current detector 6a may detect the supply current Ec of the driver 3 and generates the current detection signal SGb1. The amplitude detector 6b may detect the second amplitude Voutpp of the driving signal and generate the amplitude detection signal SGb2. Here, the term "detect" is not restricted to mean "finding out a very small quantity". The detection circuit 61 may generate a detection signal corresponding to an objective physical quantity in a wide range that covers the minimum value and the maximum value thereof.

For example, the supply current detector 6a may be a resistive element, which causes a voltage drop in proportional to the supply current Ec when the supply current Ec flows in the resistive element. The voltage drop may be used as the current detection signal SGb1. In this case, the relationship between voltage of the current detection signal SGb1 and the supply current Ec is expressed by linear expression. The voltage drop generated at the resistive element decreases the actual supply voltage that the driver 3 receives through the resistive element. Accordingly, for example a few ohm or less is preferable as resistance of the resistive element. However, small resistance, for example, less than several hundred ohm may worsen accuracy of the detection signal.

For example, the amplitude detector 6b may be a peak detector. Waveforms of the driving signal SGa3 have a peak level and a bottom level thereof. When the bottom level is kept constant, the peak level coincides with the second amplitude Voutpp. A peak detector may be configured to generate the amplitude detection signal SGb2, whose range is for example from several mili-volt up to several volt. Alternatively, a bottom detector or a combination of a peak detector and a bottom detector may be used for the amplitude detector 6b.

Figure 3:
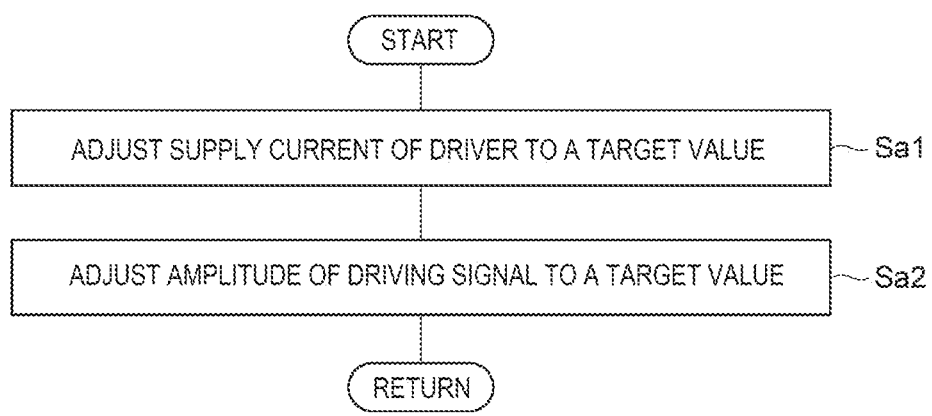
FIG. 3 is a flowchart which describes control operation for a driver in the optical transmitter according to the first embodiment of the present invention.

Next, control operation of the optical transmitter 1a according to the first embodiment of the present invention is described. In the following description, it is assumed that the supply voltage Vt is kept constant and only temperature Th of the driver 3 fluctuate. FIG. 3 is a flowchart which describes control operation for the driver 3 in the optical transmitter 1a according to the first embodiment of the present invention. As the supply voltage Vt is kept constant, the controller 5 may control the driver 3 so that the supply current Ec becomes equal to the first target value Ti, for keeping the power dissipation Pd constant against fluctuation of the temperature Th.

In the step Sa1 of FIG. 3, the controller 5 may adjust the supply current Ec to the first target value Ti. More specifically, the controller 5 may load the first target value Ti from the memory 5b, and adjust the gain control signal SGc2 to control the driver 3 so that the supply current Ec becomes equal to the first target value Ti. For example, when the driver 3 has an electrical property that increase in the gain control signal SGc2 causes increase in the supply current Ec, the controller 5 may decrease the gain control signal SGc2 when the supply current Ec is greater than the first target value Ti. Alternatively, the controller 5 may increase the gain control signal SGc2 when the supply current Ec is smaller than the first target value Ti. In this way, the controller 5 may adjust the gain control signal SGc2 until the supply current Ec substantially coincides with the first target value Ti.

In a case that differential amplifiers constitutes the driver 3, for example, including a pair of bipolar transistors whose emitters are connected to each other and a current source commonly connected to the emitters, a configuration in which the gain control signal SGc2 is input to a control terminal of the current source enables that increase in the gain control signal SGc2 causes increase in the voltage gain Av and also increase in the supply current Ec.

If the step Sa1 does not affect the temperature Th, the second amplitude Voutpp may be kept equal to the second target value Tv just after the step Sa1, as a constant temperature does not vary the voltage gain Av. However, in a case where the driver 3 shows some temperature dependence such that increase in the temperature Th causes decrease in the voltage gain Av, the second amplitude Voutpp may go below the second target value Tv because of the deterioration of the voltage gain Av. Namely, when the second amplitude Voutpp=Vinpp×Av is kept equal to the second target value Tv at a temperature, the second amplitude Voutpp becomes smaller than the second target value Tv at a higher temperature, because the voltage gain Av becomes smaller against increase in the temperature Th.

In such case, the controller 5 may adjust the second amplitude Voutpp to the second target value Tv in the step Sa2. More specifically, the controller 5 may control the signal processor 2 by using the amplitude control signal SGc1 so that the second amplitude Voutpp=Vinpp×Av becomes equal to the second target value Tv. Then, the signal processor 2 may increase the first amplitude Vinpp in accordance with the amplitude control signal SGc1 provided from the controller 5.

For example, the signal processor 2 includes an output circuit that outputs the modulation signal SGa2 through an emitter-follower or a source-follower. The emitter-follower includes a bipolar transistor, an input terminal (base of the bipolar transistor), and an output terminal (emitter of the bipolar transistor). Voltage of the output terminal follows voltage of the input terminal. The output terminal of the emitter-follower outputs the modulation signal SGa2. A bias voltage may be applied to the input terminal of the emitter follower and be varied in accordance with the amplitude control signal SGc1. In such configuration, the first amplitude Vinpp may be variable by the amplitude control signal SGc1, without changing power dissipation of the signal processor 2. A similar configuration is possible also for the source follower.

The adjustment of the second amplitude Voutpp in the step Sa2 is described in detail. According to the formula Voutpp=Vinpp×Av, decrease in the voltage gain Av may be compensated by increasing the first amplitude Vinpp for adjusting the second amplitude Voutpp to the second target value Tv (or a constant value). For example, in a case that the first amplitude Vinpp(Th1)=Vinpp1 and the voltage gain Av(Th1)=Av1 at a temperature Th1 gives the second amplitude Voutpp(Th1)=Voutpp1=Vinpp1×Av1 and the first amplitude Vinpp(Th2)=Vinpp2 and the voltage gain Av(Th2)=Av2, which is smaller than Av1, at a higher temperature Th2, which is greater than Th1, gives the second amplitude Voutpp(Th2)=Voutpp2=Vinpp2×Av2, increase in the first amplitude Vinpp from Vinpp1 to Vinpp2=Vinpp1×(Av1/Av2) may offset the decrease in the voltage gain from Av1 to Av2. Namely, Voutpp2 may become equal to Voutpp1, according to an equation: Voutpp2=Vinpp2×Av2=Vinpp1×(Av1/Av2)×Av2=Vinpp1×Av1=Voutpp1. Accordingly, when the temperature Th fluctuates from Th1 to Th2, which is higher than Th1, the controller 5 may increase the first amplitude Vinpp from Vinpp1 to Vinpp2 by the amplitude control signal SGc1 for adjusting the second amplitude Voutpp to the second target value Tv.

Reversely, in a case that when the temperature Th fluctuates from Th1 to Th3, which is lower than Th1, decrease in the first amplitude Vinpp from Vinpp1 to Vmpp(Th3)=Vinpp3=Vinpp1×(Av1/Av3) offsets the increase in the voltage gain from Av1 to Av3, which is greater than Av1. Accordingly the controller 5 decreases the first amplitude Vinpp from Vinpp1 to Vinpp3, which is smaller than Vinpp1, by the amplitude control signal SGc1 for adjusting the second amplitude Voutpp to the second target value Tv.

The order of the steps Sa1 and Sa2 is not restricted by FIG. 3. The steps Sa1 and Sa2 may be performed in parallel. For example, the controller 5 may perform the steps Sa1 and Sa2 in a time sharing system by setting a time slot thereof from several mili-second to dozens of mili-second. Accordingly, the controller 5 may perform the step Sa1 during time slot 1, and suspend the step Sa1 and perform the step Sa2 during time slot 2, and resume the step Sa1 and suspend the step Sa2 during time slot 3, and alternatively so forth.

Figure 4A:
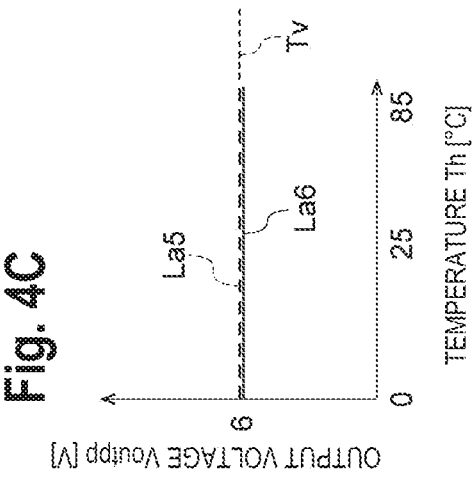
FIGS. 4A to 4C are graphs for describing effect of the optical transmitter according to the first embodiment of the present invention.
Figure 4B:
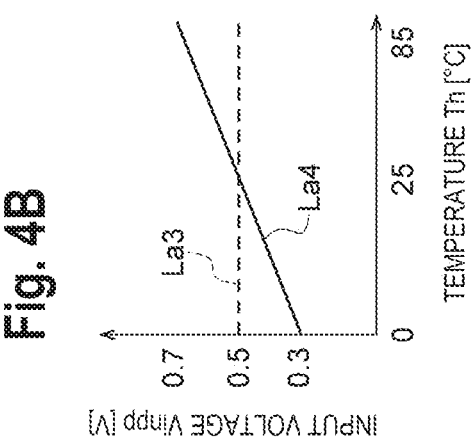
Figure 4C:
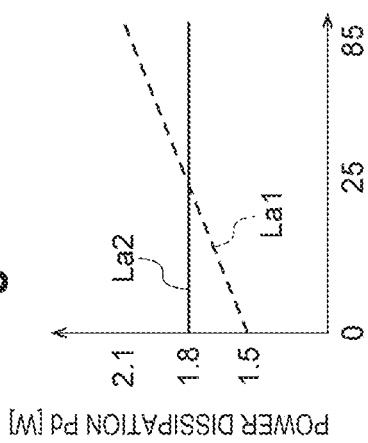

FIGS. 4A to 4C are graphs for describing effect of the optical transmitter 1a according to the first embodiment of the present invention. In FIGS. 4A to 4C, the transverse axis represents the temperature Th [° C.]. The longitudinal axes in FIGS. 4A, 4B, and 4C respectively represent power dissipation Pd [W], input voltage Vinpp [V], and output voltage Voutpp [V]. The line La1 in FIG. 4A, the line La3 in FIG. 4B, and the line La5 in FIG. 4C show characteristics of a conventional optical transmitter. The line La1 in FIG. 4A, the line La4 in FIG. 4B, and the line La6 in FIG. 4C show characteristics of the optical transmitter 1a according to the first embodiment of the present invention.

Generally, a driver (amplifier) for driving an optical modulator has a trend that voltage gain thereof is degraded at a higher temperature. The conventional optical transmitter increases supply current thereof for compensating the degradation of the voltage gain and keeping the voltage gain constant against a rising temperature. Thereby, when an input voltage Vinpp, which corresponds to amplitude (first amplitude) of an input signal input to the driver, is kept constant (0.5 V) against change in the temperature Th (the line La3), the voltage gain Av kept constant provides a constant output voltage Voutpp (6V, the line La5), which corresponds to amplitude of an output signal output from the driver, according to the relationship Voutpp=Vinpp×Av. Such constant output voltage Voutpp is suitable for driving optical modulators. However, power dissipation Pd may increase with increase in the temperature Th (the line La1), because the power dissipation may be proportional to the supply current Ec as expressed by Pd [W]=Vt [V]×Ec [A], where Vt is supply voltage supplied to the driver and here assumed to be constant.

For example, in a case that increase in the temperature Th causes increase in the power dissipation Pd (the line La1), the power dissipation Pd becomes the maximum value thereof Pdmax=2.1 W, when the temperature Th reaches the maximum value thereof Thmax=85° C. The maximum value Pdmax=2.1 W is greater by about 17% than a typical value Pdtyp=1.8 W at a typical temperature Thtyp=25° C. In contrast, the optical transmitter 1a according to the first embodiment of the present invention may keep the power dissipation Pd constant (1.8 W) against the change of from 25° C. to 85° C. in the temperature Th (the line La2). The optical transmitter 1a sets the supply current Ec independent of the temperature Th.

More specifically, the first target value Ti is set a constant value independent of the temperature Th. The controller 5 may calculate a value of the supply current Ec based at least in part on the current detection signal SGb1, and adjusts the gain control signal SGc2 for equalizing the supply current Ec to the first target value Ti. Although the primary purpose of the gain control signal SGc2 may be to vary the voltage gain Av, the controller may use the gain control signal SGc2 to vary the supply current Ec as described above. In most cases, larger voltage gain Av requires larger supply current Ec (and power dissipation Pd). When the supply current Ec is kept equal to the first target value Ti, the voltage gain Av may fluctuates because of change in the temperature Th. Increasing the input voltage Vinpp (along the line La4) by adjusting the amplitude control signal SGc1 may offset decrease in the voltage gain Av and keep the output voltage Voutpp equal to the second target value Tv (for example, a constant value of 6V) against increase in the temperature Th (the line La6).

In other words, when the first target value Ti is set to a constant value independent of the temperature Th and the supply current should be kept equal to the first target value Ti, the controller 5 may detect degradation of the voltage gain Av based at least in part on the amplitude detection signal SGb2 corresponding to the output voltage Voutpp, as decrease in the voltage gain Av causes decrease in the output voltage Voutpp. Then, the controller 5 may increase the input voltage Vinpp by using the amplitude control signal SGc1 for compensating the degradation of the voltage gain Av and keeping the output voltage Voutpp equal to the second target value Tv (a constant value). Namely, according to the formula Voutpp=Vinpp×Av, increasing in the input voltage Vinpp may offset decrease in the voltage gain Av for keeping the output voltage Voutpp constant (the step Sa2 in FIG. 3), while the controller 5 keeps the supply current Ec equal to the first target value Ti (the step Sa1 in FIG. 3). In this way, for example, when the temperature Th reaches the maximum value Thmax=85° C., the optical transmitter 1a may reduce the maximum value Pdmax to 1.8 W (the line La2 in FIG. 3) from 2.1 W of the conventional transmitter (the line La1). Therefore, the optical transmitter 1a may improve the temperature dependence of the power dissipation Pd while keeping the output voltage Voutpp equal to the second target value.

As described above, the optical transmitter 1a according to the first embodiment of the present invention may provide detection of the supply current of the driver 3 by the current detector 6a, detection of the output voltage (second amplitude) of the driver 3 by the amplitude detector 6b, adjustment of the supply current and the output voltage based on the detection results (detection signals) thereof, for reducing power dissipation of the driver 3 and also the optical transmitter 1a.

Adjustment of the supply current may decrease the output voltage Voutpp (second amplitude) of the driving signal SGa3. However, the amplitude detection signal SGb2 output by the amplitude detector 6b and the amplitude control signal SGc1 generated by the controller 5 based at least in part on the amplitude detection signal Sgb2 enables increase of the input voltage Vinpp (second amplitude) for compensating the decrease of the output voltage Voutpp. Also, the current detection signal SGb1 output by the current detector 6a and the gain control signal SGc2 generated by the controller 5 based at least in part on the current detection signal SGb1 enables adjustment of the supply current to the first target value for reducing the power dissipation Pd. Further, when the supply current Ec is kept equal to the first target value Ti, the controller 5 adjusts the input voltage Vinpp (first amplitude) based at least in part on the amplitude detection signal SGc2 for adjusting the output voltage Voutpp (second amplitude) to the second target value Tv. Therefore, the optical transmitter 1a may adjust the input voltage Vinpp for setting the output voltage Voutpp to a desired value.

As described above, the optical transmitter 1a may separately control the power dissipation of the driver 3 and voltage amplitude Voutpp (second amplitude) of the driving signal SGa3 output from the driver 3. Accordingly, while keeping the voltage amplitude Voutpp constant, the optical transmitter 1a may reduce power dissipation of the driver 3. Also, as a variation of the optical transmitter according to the first embodiment of the present invention, in a case where the controller 5 includes the operational amplifier 5e1 as shown in FIG. 2, the operational amplifier 5e1 allows a simple configuration for generating the gain control signal SGc2 in accordance with the current detection signal SGb1. For example, the operational amplifier 5e1 may constitute a comparator having a pair of input terminals 5e11 and 5e12. Namely, the controller 5 may include a comparator derived from the operational amplifier 5e1. One of the input terminals 5e11 (first input terminal) receives the current detection signal SGb1 and other of the input terminals 5e12 (second input terminal) receives a reference voltage Vref that corresponds to a potential of the current detection signal SGb1 when the supply current Ec coincides with the first target value Ti. The operational amplifier 5e1 generates an analog output signal in accordance with difference in voltage between the two input terminals 5e11 and 5e12. The analog output signal may be used as the gain control signal SGc2. Namely, the current detector 6a, the gain control circuit 5e, and the driver 3 may constitute a feed-back loop for reducing difference in voltage between the current detection signal SGb1 and the reference voltage Vref. The driver 3 varies the voltage gain Av and the supply current Ec in accordance with the gain control signal SGc2. In this way, the operational amplifier 5e1 may provide an analog feed-back loop, which does not need the ADC 5c to convert the current detection signal SGb1 to digital data and the DAC 5d to convert a gain control data to the gain control signal SGc2. Thereby, the gain control circuit 5e including the operational amplifier 5e1 may reduce circuit scale of the controller 5. Also, the logic circuit 5a may just provide the reference voltage Vref to the gain control circuit 5e and save logical operation for calculating the gain control data based on the current detection signal SGb1 and the first target value Ti.

Second Embodiment

Figure 5:
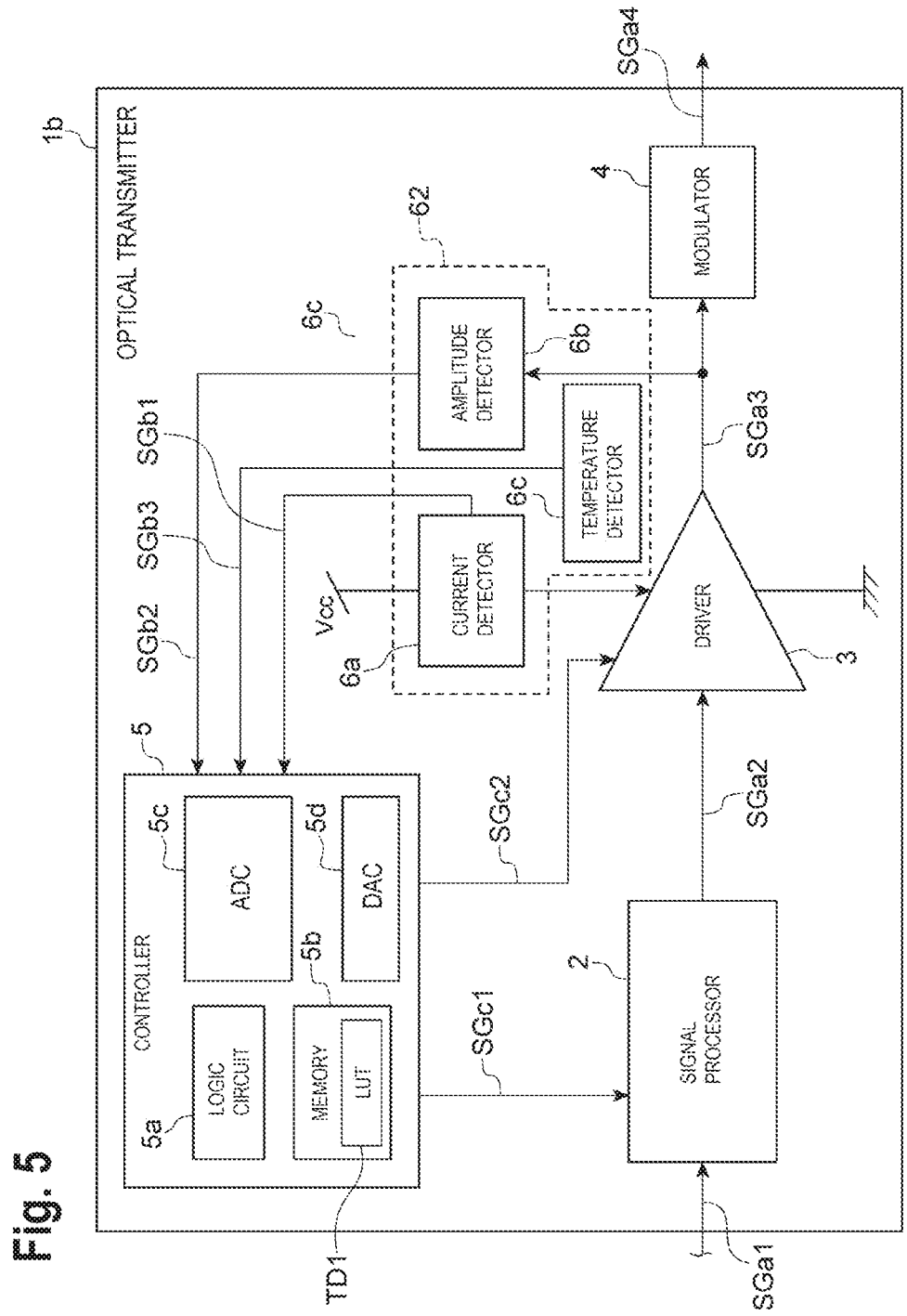
FIG. 5 is a diagram which schematically shows a configuration of an optical transmitter according to a second embodiment of the present invention.

FIG. 5 is a diagram which schematically shows a configuration of an optical transmitter 1b according to a second embodiment of the present invention. The optical transmitter 1b may be used in a coherent optical transceiver that performs a multi-level phase modulation like the DP-QPSK system or the DP-16QAM system, as with the optical transmitter 1a according to the first embodiment of the present invention. In the configuration of the optical transmitter 1b, the detection circuit 62 is modified from the detection circuit 61 in the configuration of the optical transmitter 1a. The configuration of the optical transmitter 1b is identical with the configuration of the optical transmitter 1a except the detection circuit 61 and the detection circuit 62.

In the following description of the second embodiment, it is assumed that the supply voltage Vt is kept constant and the temperature Th may fluctuate, as with the optical transmitter 1a according to the first embodiment of the present invention. For the configuration of the optical transmitter 1b, the different parts from the configuration of the optical transmitter 1a is described.

Note that the configuration of the optical transmitter 1b may include a plurality of drivers 3 and a plurality of detection circuits 62, although only one driver 3 and one detection circuit 62 are drawn in FIG. 5 for simplification. In that case, the drivers 3 are connected in parallel between the signal processor 2 and the modulator 4. The signal processor 2 may provide a plurality of modulation signals to the drivers 3. Each driver 3 may provide a driving signal to a Mach-Zhender modulator in the modulator 4. The drivers 3 may be coupled with the detection circuits 62 one by one. Each detection circuit 62 may provide detection signals thereof SGb1, SGb2, and SGb3 to the controller 5.

The optical transmitter 1b includes the detection circuit 62 instead of the detection circuit 61, in comparison with the optical transmitter 1a. The detection circuit 62 includes the supply current detector 6a, the amplitude detector 6b, and a temperature detector 6c. The temperature detector 6c includes a temperature sensor (not drawn) and detects the temperature Th of the driver 3 by using the temperature sensor. The temperature detector 6c generates a temperature detection signal SGb3 based on the detection result and outputs the temperature detection signal SGb3 to the controller 5. The temperature sensor may be arranged near the driver 3, for precisely detecting the temperature Th of the driver 3. The temperature sensor is for example a thermistor.

The controller 5 is electrically connected to the signal processor 2, the driver 3, and the detection circuit 62. The logic circuit 5a is for example a CPU. The logic circuit 5a executes a computer program that the memory stores, for controlling the signal processor 2 and the driver 3 based at least in part on a plurality of detection results by the detection circuit 62 and a plurality of target values stored in the memory 5b. For example, the first target value Ti and the second target value Tv may be stored as digital data in the memory 5b. The logic circuit 5a receives the detection signals SGb1, SGb2, and SGb3 from the detection circuit 62 through the ADC 5c, and separately outputs the amplitude control signal SGc1 to the signal processor 2 through the DAC 5d and the gain control signal Sgc2 to the driver 3 through the DAC 5d. The logic circuit 5a generates the amplitude control signal SGc1 and the gain control signal Sgc2 based at least in part on the detection signals SGb1, SGb2, and SGb3, and the target values Ti and Tv stored in the memory 5b.

The memory 5b stores table data LUT1 (Lookup Table) that represents the relationship between the temperature Th and the first target value Ti. The logic circuit 5a receives a temperature detection signal SGb3 from the temperature detector 6c and calculates the temperature Th based on the temperature detection signal SGb3. The logic circuit 5a acquires the first target value Ti that corresponds to the calculated temperature Th by looking up the table data LUT1.

The controller 5 controls the signal processor 2 and the driver 3 for adjusting the second amplitude Voutpp to the second target value Tv and simultaneously restraining increase in power dissipation Pd. The table data LUT1 may include a plurality of values of the temperature Th (temperature values) and a plurality of the first target values Ti. The first target values Ti may correspond to the temperature values Th one by one. Each number of the temperature values Th and the first target values Ti may be greater than 1. Note that a same value may be duplicated in the first target values Ti. For example, the table data LUT1 may include two first target values Ti. One of the first target value Ti may be a value Ti1 related to the minimum value Thmin of the temperature Th and other of the first target values Ti may be a value Ti2 related to the maximum value Thmax of the temperature Th. The first target value Ti(Th) for a value Th between the minimum value Thmin and the maximum value Th max may be derived using a formula: Ti=(Ti2−Ti1)/(Thmax−Thmin)×(Th−Thmin)+Ti1.

When the relationship between the first target values Ti and the temperature Th is expressed by linear expression like Ti(Th)=A×Th+B, where A is a coefficient and B is a constant, the memory 5b may store only the coefficient A and the constant B instead of the table data LUT1. The logic circuit 5a may calculate the first target value from the temperature Th detected by the temperature detector 6c. Note that the first target value corresponding to the detected temperature Ti(h) is expressed just as Ti(Th)=B in a case of the line La2 in FIG. 4A. In such case, the memory 5b stores only the constant B as single target value. In this way, simplified relationship between the first target value and the temperature Th may reduce size of the table data TD1 and capacity of the memory 5b for storing the table data TD1.

The controller 5 controls the driver 3 for setting the supply current Ec to the first target value Ti. As described above, the first target value Ti corresponding to the temperature Th detected by the temperature detector 6c may be determined according to the table data LUT. The table data LUT1 is stored in the memory 5b in advance, for example based on measurement results of the supply current Ec. In a case that desired values Tpd [W] of the power dissipation Pd [W] are predetermined against a plurality of values of the temperature Th, the first target values Ti [A] that constitute the table data LUT may be determined according a formula Ti=Tpd/Vt, where the supply voltage Vt is constant as described above. The controller 5 acquires the first target value Ti by referring the table data LUT1 stored in the memory 5b based on the temperature detection signal SGb3.

More specifically, in a case of FIG. 4A, for example, the power dissipation Pd at the typical temperature Thtyp (25° C.) is set to the typical value Pdtyp (1.8 W) and the power dissipation Pd at the maximum temperature Thmax (85° C.) is set to the maximum value Pdmax (2.1 W) according to measurement results Mpd(Th) under the condition that the supply voltage Vt is kept constant. The measurement results Mpd(Th) of the power dissipation Pd may be obtained by measurement under the condition that the input voltage Vinpp is kept constant (0.5V, the line La3 in FIG. 4B) and the output voltage is kept constant (6V, the line La5 in FIG. 4C). The target values Tpd(Th) of the power dissipation Pd(Th) may be determined by using a formula Tpd(Th)=Mpd(Th)×(Pdtyp/Pdmax). This means that the target value TPd(Thmax) at the maximum temperature Thmax may be reduced to the typical value Pdtyp, when the controller 5 controls the supply current Ec according to the first target value Ti [A]. Namely, the power dissipation Pd of the optical transmitter 1b (the line Latin FIG. 4A) does not exceed the typical value Pdtyp of the conventional optical transmitter (the line La1 in FIG. 4A) even at the maximum temperature Thmax (85° C.).

Figure 6:
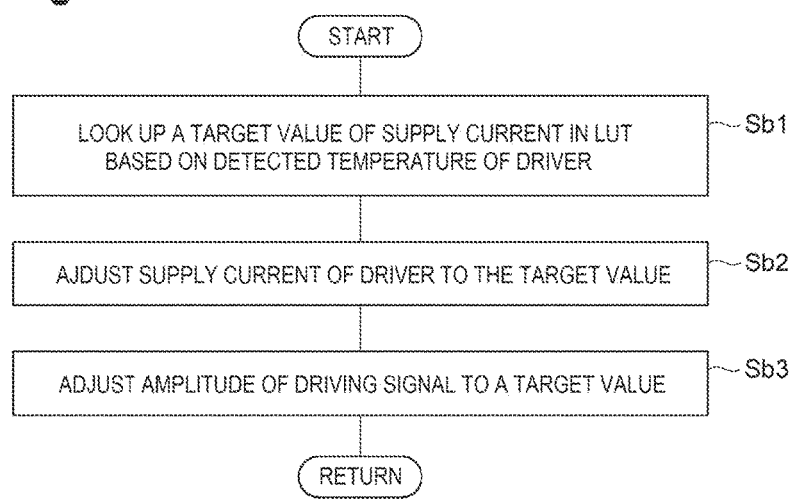
FIG. 6 is a flowchart which describes control operation for a driver in the optical transmitter according to the second embodiment of the present invention.

Next, control operation of the optical transmitter 1b according to the second embodiment of the present invention is described. FIG. 6 is a flowchart which describes the control operation for the driver 3 in the optical transmitter 1b according to the second embodiment of the present invention. In the step Sb1, the controller 5 determines the first target value Ti corresponding to the detected temperature Th according to the table data LUT1. More specifically, the logic circuit 5a calculates the detected temperature Th from the temperature detection signal SGb3 and looks up the first target value Ti corresponding to the detected temperature Th in the table data LUT1. Next, the controller 5 performs the steps Sb2 and Sb3. Because the steps Sb2 and Sb3 are respectively identical with the step Sa1 and Sa2 in FIG. 3 according the first embodiment of the present invention, the description of the steps Sb2 and Sb3 is omitted to avoid duplicating descriptions.

Figures 7A, 7B, 7C:
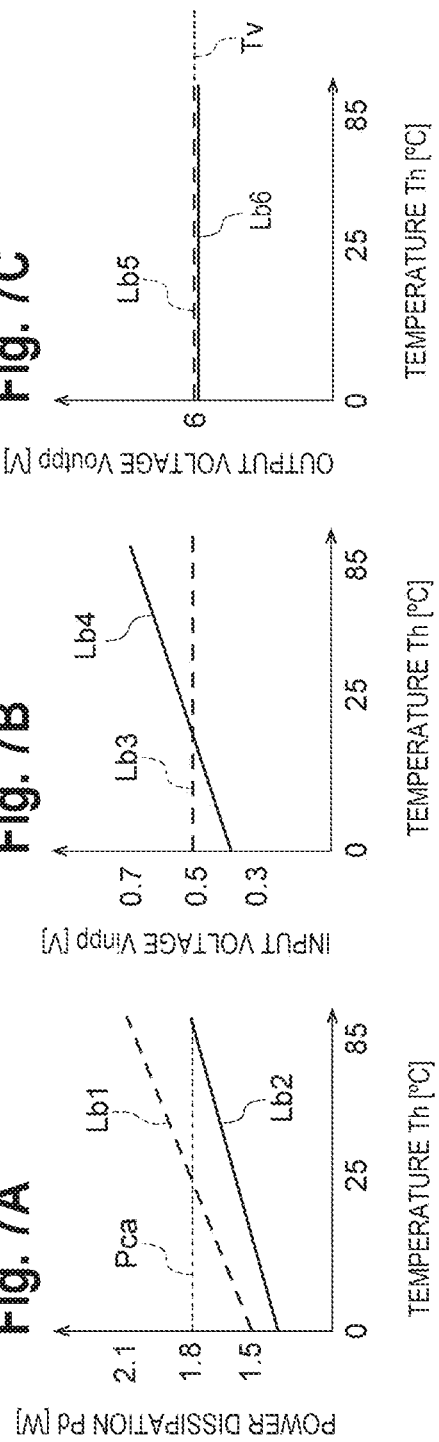
FIGS. 7A to 7C are graphs for describing effect of the optical transmitter according to the second embodiment of the present invention.

FIGS. 7A to 7C are graphs for describing effect of the optical transmitter 1b according to the second embodiment of the present invention. In FIGS. 7A to 7C, the transverse axis represents the temperature Th [° C.]. The longitudinal axes in FIGS. 7A, 7B, and 7C respectively represent power dissipation Pd [W], input voltage Vinpp [V], and output voltage Voutpp [V]. The line Lb1 in FIG. 7A, the line Lb3 in FIG. 7B, and the line Lb5 in FIG. 7C show characteristics of a conventional optical transmitter. The line Lb2 in FIG. 7A, the line Lb4 in FIG. 7B, and the line Lb6 in FIG. 4C show characteristics of the optical transmitter 1b according to the second embodiment of the present invention.

As described above, it is known that generally a driver (amplifier) for driving an optical modulator has a trend that voltage gain thereof is degraded at a higher temperature. Accordingly, the conventional optical transmitter increases supply current Ec thereof for compensating the degradation of the voltage gain Av and keeping the voltage gain Av constant against a rising temperature. The constant voltage gain Av and the constant input voltage Vinpp (0.5V, the line Lb3 in FIG. 7B) provide the constant output voltage Voutpp (6V, the line Lb5 in FIG. 7C) according to the formula Voutpp=Vinpp×Av. However, according to the formula Pd=Ec×Vt, increase in the supply current Ec causes increase in the power dissipation Pd, as the power dissipation is proportional to the supply current Ec when the supply voltage Vt is kept constant (the line Lb1 in FIG. 7A).

In contrast, the optical transmitter 1b according to the second embodiment of the present invention may adjust the supply current Ec to the first target value Ti so that the power dissipation Pd does not exceed a constant value Pca (1.8 W) for the whole temperature range (the line Lb2 in FIG. 7A). Although increase in the supply current Ec enables increase in the voltage gain Av for compensating degradation of the voltage gain Av with increase in the temperature, increasing in the input voltage Vinpp with increase in the temperature (the line Lb4 in FIG. 7B) may compensate the temperature dependence of the voltage gain Av for keeping the output voltage Voutpp constant (6V, the line Lb6 in FIG. 7C). Namely, according to the formula Voutpp=Vinpp×Av, a decreased voltage gain Av and an increased input voltage Vinpp may keep the output voltage Voutpp constant. Accordingly, the optical transmitter 1b may restrain the power dissipation Pd from exceeding the constant value Pca (the line Lb2 in FIG. 7A), while keeping the output voltage Voutpp constant (the line Lb6 in FIG. 7C). Note that the constant value Pca coincides with the typical value of the power dissipation at the typical temperature (for example 25° C.) in the conventional optical transmitter. As shown in FIG. 7A, the power dissipation Pd of the optical transmitter 1b (the line Lb2) is smaller than the power dissipation Pd of the conventional optical transmitter (the line Lb1) in the temperature range from 0° C. to 85° C. Thereby, the optical transmitter 1b may reduce the power dissipation Pd in comparison with the conventional optical transmitter. For example, The power dissipation Pdmax of the optical transmitter 1b at the maximum temperature Thmax (85° C.) is 1.8 W, which corresponds to 86% of the power dissipation Pdmax of the conventional optical transmitter (2.1 W).

As described above, the optical transmitter 1b according to the second embodiment of the present invention may generate the temperature detection signal SGb3 corresponding to the temperature Th of the driver 3 and look up the first target value Ti based at least in part on the temperature detection signal SGb3 according to the table data LUT1 for adjusting the supply current Ec to the first target value Ti in accordance with the temperature Th. Accordingly, against fluctuation in the temperature Th, the optical transmitter 1b adjusts the input voltage Vinpp (first amplitude) to the second target value Tv stored in the memory 5b for keeping the output voltage Voutpp (second amplitude) constant and simultaneously reducing the power dissipation Pd.

Third Embodiment

Figure 8:
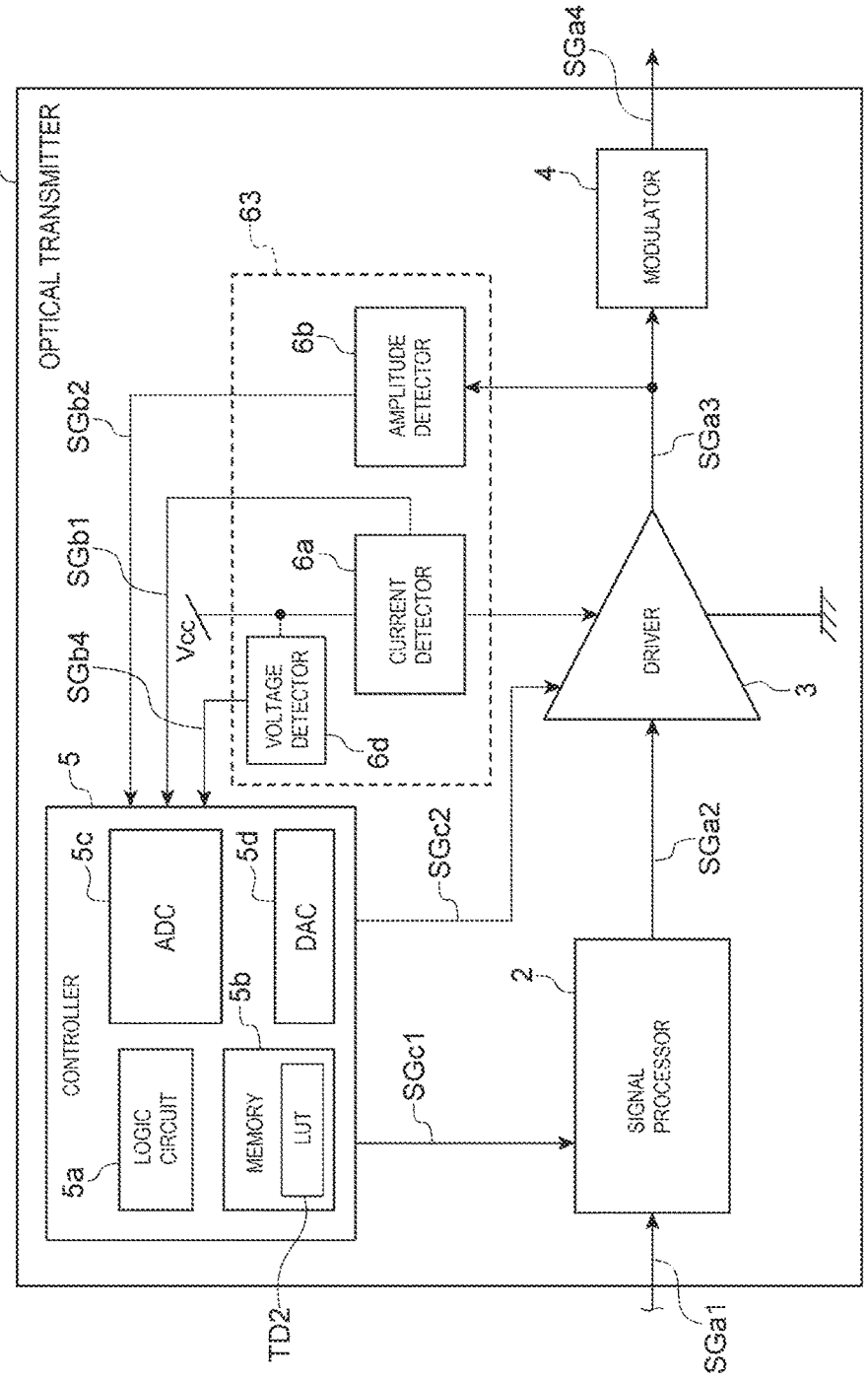
FIG. 8 is a diagram which schematically shows a configuration of an optical transmitter according to a third embodiment of the present invention.

FIG. 8 is a diagram which schematically shows a configuration of an optical transmitter 1c according to a third embodiment of the present invention. The optical transmitter 1b may be used in a coherent optical transceiver that performs a multi-level phase modulation like the DP-QPSK system or the DP-16QAM system, as with the optical transmitter 1a according to the first embodiment of the present invention. In the configuration of the optical transmitter 1c, the detection circuit 63 is modified from the detection circuit 61 in the configuration of the optical transmitter 1a. The configuration of the optical transmitter 1b is identical with the configuration of the optical transmitter 1a except the detection circuit 61 and the detection circuit 63.

In the following description of the optical transmitter 1c according to the third embodiment, it is assumed that the temperature Th of the driver 3 is kept constant and the supply voltage Vt may vary. For the configuration of the optical transmitter 1c, the different parts from the configuration of the optical transmitter 1a is described.

Note that the configuration of the optical transmitter 1c may include a plurality of drivers 3 and a plurality of detection circuits 63, although only one driver 3 and one detection circuit 63 are drawn in FIG. 8 for simplification. In that case, the drivers 3 are connected in parallel between the signal processor 2 and the modulator 4. The signal processor 2 may provide a plurality of modulation signals to the drivers 3. Each driver 3 may provide a driving signal to a Mach-Zhender modulator in the modulator 4. The drivers 3 may be coupled with the detection circuits 63 one by one. Each detection circuit 63 may provide detection signals thereof SGb1, SGb2 and SGb4 to the controller 5.

The optical transmitter 1c includes the detection circuit 63 instead of the detection circuit 61, in comparison with the optical transmitter 1a. The detection circuit 63 includes the supply current detector 6a, the amplitude detector 6b, and a voltage detector 6d that detects the supply voltage Vt of the driver 3. The voltage detector 6d generates a voltage detection signal SGb4 based on the detection result and outputs the voltage detection signal SGb4 to the controller 5. The voltage detector 6d may alternatively be connected to a node between the current detector 6a and the driver 3.

The controller 5 is electrically connected to the signal processor 2, the driver 3, and the detection circuit 63. The logic circuit 5a executes a computer program that the memory 5b stores, for controlling the signal processor 2 and the driver 3 based at least in part on a plurality of detection results by the detection circuit 63 and a plurality of target values stored in the memory 5b. The logic circuit 5a receives the detection signals SGb1, SGb2, and SGb4 from the detection circuit 63 through the ADC 5c, and separately outputs the amplitude control signal SGc1 to the signal processor 2 through the DAC 5d and the gain control signal Sgc2 to the driver 3 through the DAC 5d. The logic circuit 5a generates the amplitude control signal SGc1 and the gain control signal Sgc2 based at least in part on the detection signals SGb1, SGb2, SGb4, and the target values Ti and Tv stored in the memory 5b.

The memory 5b stores table data LUT2 (Lookup Table) that represents the relationship between the supply voltage Vt and the first target value Ti. The logic circuit 5a receives the voltage detection signal SGb4 from the voltage detector 6d and calculates the supply voltage Vt based on the voltage detection signal SGb4. The logic circuit 5a acquires the first target value Ti that corresponds to the calculated supply voltage Vt by looking up the table data LUT2.

The controller 5 controls the signal processor 2 and the driver 3 for adjusting the second amplitude Voutpp to the second target value Tv and simultaneously restraining increase in power dissipation Pd. In the optical transmitter 1c according to the third embodiment of the present invention, the first target value Ti may be determined in accordance with the supply voltage Vt. The memory 5c stores the table data LUT2 that includes a plurality of values of the supply voltage Vt (voltage values) and a plurality of the first target values Ti. The first target values Ti corresponds to the values of the supply voltage Vt one by one. Each number of the temperature values Th and the first target values Ti may be greater than 1. Note that a same value may be duplicated in the first target values Ti. The table data LUT2 is stored in the memory 5b in advance, for example based on measurement results of the supply current Ec.

The controller 5 may obtain the first target value Ti corresponding to the supply voltage Vt detected by the voltage detector 6d according to the table data LUT2 stored in the memory 5b. In a case that desired values Tpd(Vt) of the power dissipation Pd are predetermined against a plurality of values of the supply voltage Vt, where Tpd(Vt) denotes a function of Vt, the first target values Ti that constitute the table data LUT2 may be determined according a formula Ti(Vt)=Tpd(Vt)/Vt. For example, the desired values Tpd(Vt) may be determined based on measurement results, which are acquired by measurement under the condition that the input voltage Vinpp is kept constant and the output voltage is kept constant.

Figure 9:
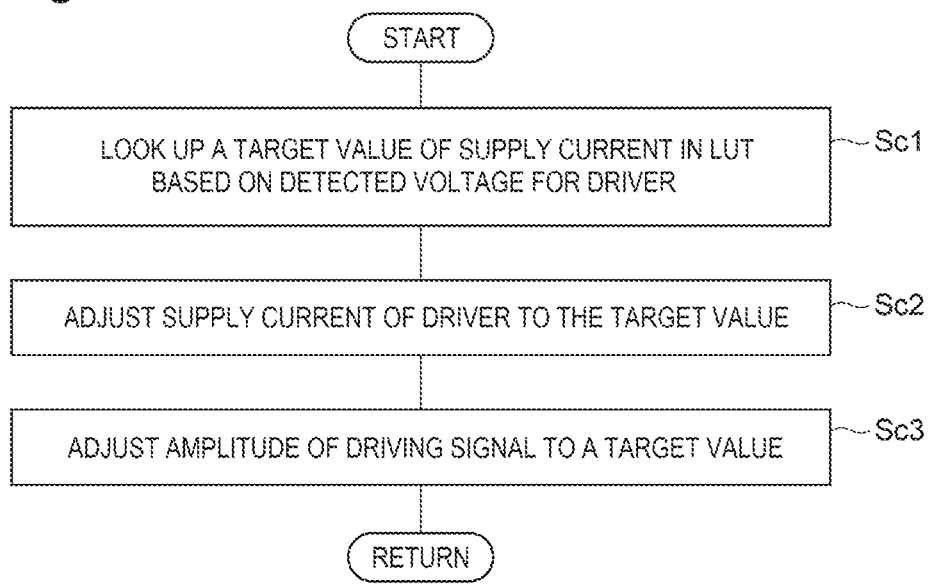
FIG. 9 is a flowchart which describes control operation for a driver in the optical transmitter according to the third embodiment of the present invention.

Next, control operation of the optical transmitter 1c according to the third embodiment of the present invention is described. FIG. 9 is a flowchart which describes control operation for the driver 3 in the optical transmitter 1c according to the third embodiment of the present invention. In the step Sc1, the controller 5 determines the first target value Ti corresponding to the detected supply voltage Vt according to the table data LUT2. More specifically, the logic circuit 5a calculates the detected supply voltage Vt from the voltage detection signal SGb4 and looks up the first target value Ti corresponding to the detected supply voltage Vt in the table data LUT2. Next, the controller 5 performs the steps Sc2 and Sc3. Because the steps Sc2 and Sc3 are respectively identical with the step Sa1 and Sa2 in FIG. 3 according the first embodiment of the present invention, the description of the steps Sc2 and Sc3 is omitted to avoid duplicating descriptions.

Figure 10:
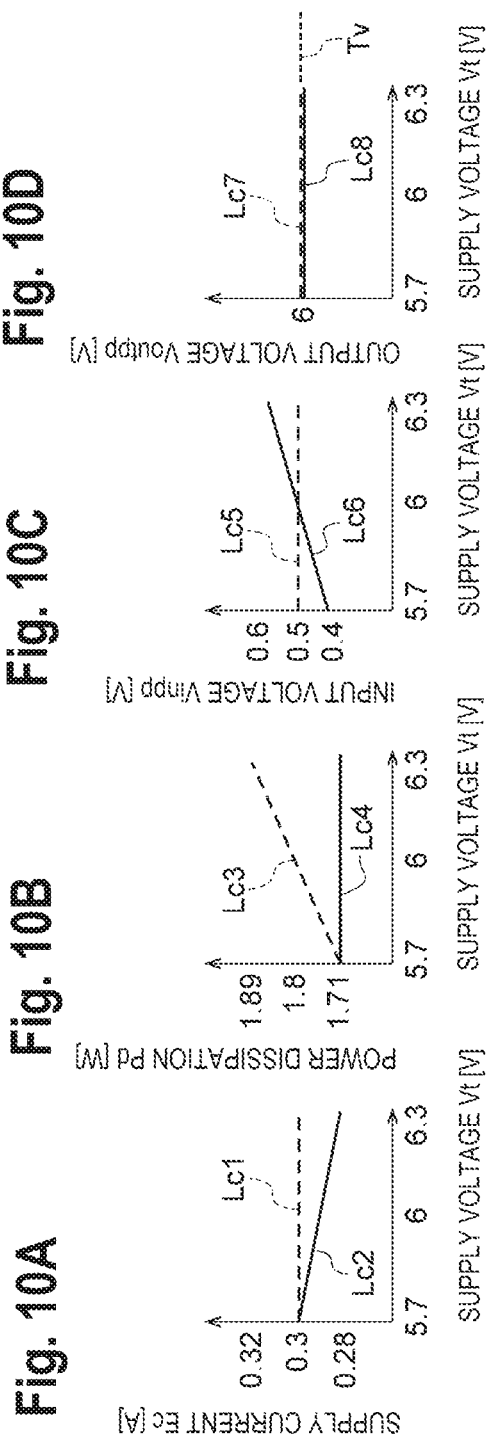
FIGS. 10A to 10D are graphs for describing effect of the optical transmitter according to the third embodiment of the present invention.

FIGS. 10A to 10D are graphs for describing effect of the optical transmitter 1c according to the third embodiment of the present invention. In FIGS. 10A to 10D, the transverse axis represents the supply voltage Vt [V]. The longitudinal axes in FIGS. 10A, 10B, 10C, and 10D respectively represent supply current Ec [A], power dissipation Pd [W], input voltage Vinpp [V], and output voltage Voutpp [V]. The line Lc1 in FIG. 10A, the line Lc3 in FIG. 10B, the line Lc5 in FIG. 10C, and the line Lc7 in FIG. 10D show characteristics of a conventional optical transmitter. The line Lc2 in FIG. 10A, the line Lc4 in FIG. 10B, the line Lc6 in FIG. 10C, and the line Lc8 in FIG. 10D show characteristics of the optical transmitter 1c according to the third embodiment of the present invention.

Under the condition that the temperature Th is kept constant, the conventional optical transmitter may keep the supply current Ec constant (for example 0.3 A, the line Lc1 in FIG. 10A) for keeping the voltage gain Av constant. When the voltage gain Av is kept constant, the output voltage Voutpp is proportional to the input voltage Vinpp as expressed by the formula Voutpp=Vinpp×Av. Accordingly, the controller 5 may keep the input voltage Vinpp constant (for example 0.5V, the line Lc5 in FIG. 10C) for keeping the output voltage Voutpp constant (for example 6V, the line Lc7 in FIG. 10D) independently of the supply voltage Vt. Such constant output voltage Voutpp is suitable for driving optical modulators as described above. However, the power dissipation Pd, which is a product of the supply current Ec and the supply voltage Vt as expressed by a formula Pd=Ec×Vt, increases with increase in the supply voltage Vt (the line Lc3 in FIG. 10B).

Differently, the optical transmitter 1c may decrease the supply current Ec in response to increasing in the supply voltage Vt (the line Lc2 in FIG. 10A) so that the power dissipation Pd is kept constant (for example 1.71 W, the line Lc4 in FIG. 10B). Actually, the controller 5 may adjust the supply current Ec to the first target value Ti in the feedback loop constituted by the current detector 6a, the controller 5, and the driver. The target value Ti is determined so that a product of the supply voltage Vt and the first target value Ti become equal to a constant value (for example 1.71 W). Although decrease in the supply current Ec causes decrease in the voltage gain Av as described above, the optical transmitter 1c may increase the input voltage Vinpp in accordance with increase in the supply voltage Vt (the line Lc6 in FIG. 10C) for compensating the degradation of the voltage gain Av and keeping the output voltage Voutpp constant (the line Lc4 in FIG. 10B). Accordingly, the optical transmitter 1c may reduce the power dissipation Pd, while keeping the output voltage Voutpp constant. In other words, in the optical transmitter 1c, the first target value Ti may be determined so that a product of the supply voltage Vt and the first target value Ti becomes constant. When the controller 5 adjusts the supply current Ec to the first target value Ti by using the current detection signal SGb1 and the gain control signal SGc2, the controller 5 may increase the input voltage Vinpp by using the amplitude detection signal SGb2 and the amplitude control signal SGc1 for compensating the degradation of the voltage gain Av due to decrease in the supply current Ec and adjusting the output voltage Voutpp to the second target value Tv.

As described above, the optical transmitter 1c according to the third embodiment of the present invention may generate the voltage detection signal SGb4 corresponding to the supply voltage Vt of the driver 3 and look up the first target value Ti based at least in part on the voltage detection signal SGb4 according to the table data LUT2 for adjusting the supply current Ec to the first target value Ti in accordance with the supply voltage Vt. The first target value Ti may be determined in advance so that a product of the supply voltage Vt and the first target value Ti become a desired value. In other words, the optical transmitter 1c may prepare a table data that represents the relationship between the supply voltage Vt and the first target value Ti, and obtain the first target value Ti corresponding to the supply voltage Vt detected by the voltage detector 6d according to the table data. Thereby, the optical transmitter 1c may set the first target value Ti suitable for the supply current and reduce increase in the power dissipation Pd, when the supply voltage Vt fluctuates. In a case where decrease in the supply current Ec causes decrease in the voltage gain Av, the optical transmitter 1c may increase the input voltage Vinpp for compensating the degradation of the voltage gain Av and keeping the output voltage Voutpp constant. Accordingly, against fluctuation in the supply voltage Vt, the optical transmitter 1c may adjust the input voltage Vinpp (first amplitude) to the second target value Tv stored in the memory 5b for keeping the output voltage Voutpp (second amplitude) constant and simultaneously reducing the power dissipation Pd.

Fourth Embodiment

Figure 11:
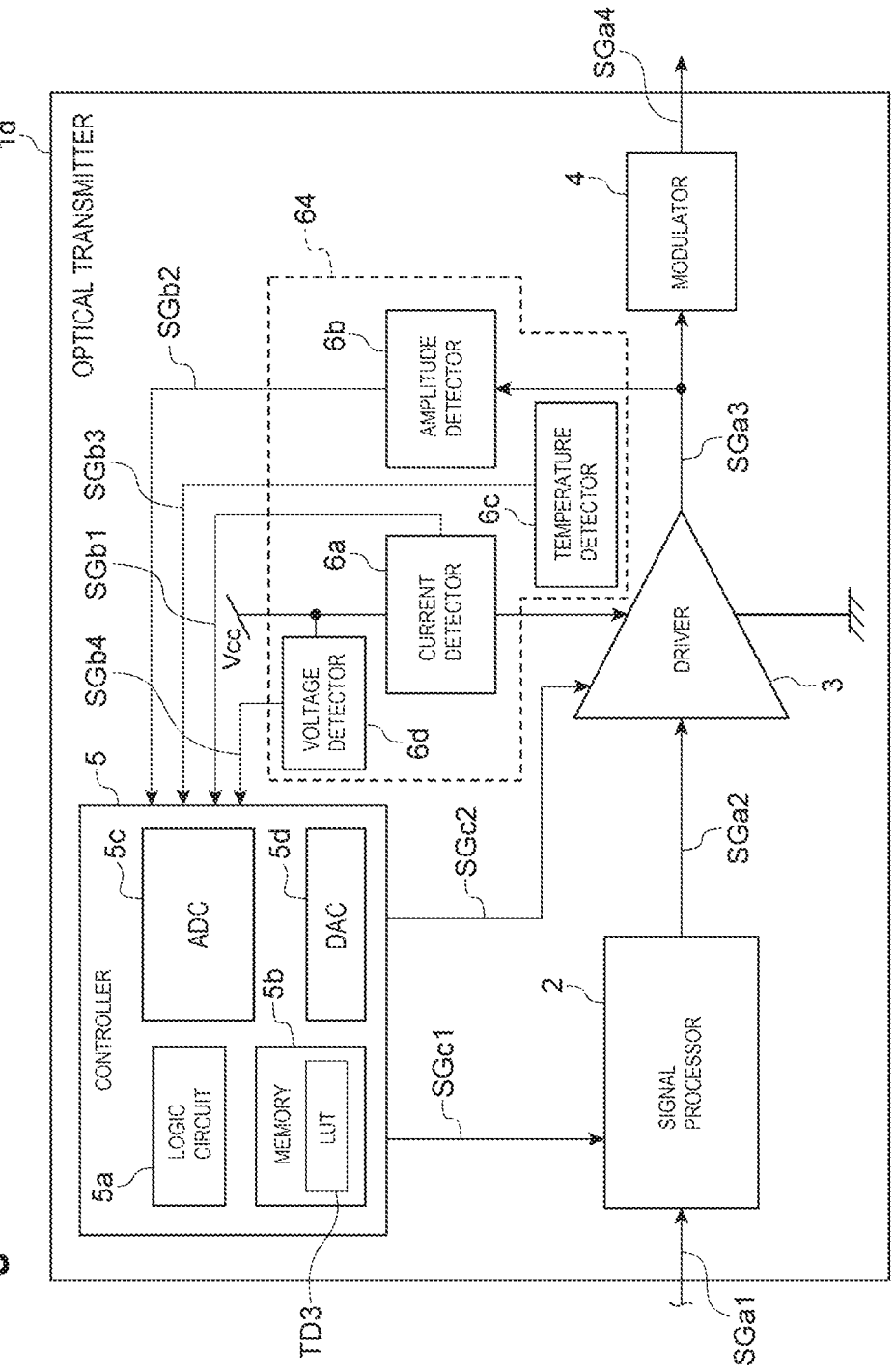
FIG. 11 is a diagram which schematically shows a configuration of an optical transmitter according to a fourth embodiment of the present invention.

FIG. 11 is a diagram which schematically shows a configuration of an optical transmitter 1d according to a fourth embodiment of the present invention. The optical transmitter 1d may be used in a coherent optical transceiver that performs a multi-level phase modulation like the DP-QPSK system or the DP-16QAM system, as with the optical transmitter 1a according to the first embodiment of the present invention. In the configuration of the optical transmitter 1d, the detection circuit 64 is modified from the detection circuit 61 in the configuration of the optical transmitter 1a. The configuration of the optical transmitter 1d is identical with the configuration of the optical transmitter 1a except the detection circuit 61 and the detection circuit 64.

In the following description of the optical transmitter 1d according to the third embodiment, it is assumed that both the temperature Th of the driver 3 and the supply voltage Vt of the driver 3 may fluctuate. For the configuration of the optical transmitter 1*d*, the different parts from the configuration of the optical transmitter 1*a* is described.

Note that the configuration of the optical transmitter 1*d* may include a plurality of drivers 3 and a plurality of detection circuits 64, although only one driver 3 and one detection circuit 64 are drawn in FIG. 11 for simplification. In that case, the drivers 3 are connected in parallel between the signal processor 2 and the modulator 4. The signal processor 2 may provide a plurality of modulation signals to the drivers 3. Each driver 3 may provide a driving signal to a Mach-Zhender modulator in the modulator 4. The drivers 3 may be coupled with the detection circuits 64 one by one. Each detection circuit 64 may provide detection signals thereof SGb1, SGb2, SGb3, and SGb4 to the controller 5.

The optical transmitter 1*d* includes the detection circuit 64 instead of the detection circuit 61, in comparison with the optical transmitter 1*a*. The detection circuit 62 includes the supply current detector 6*a*, the amplitude detector 6*b*, temperature detector 6*c*, and a voltage detector 6*d*.

The controller 5 is electrically connected to the signal processor 2, the driver 3, and the detection circuit 64. The logic circuit 5*a* executes a computer program that the memory 5*b* stores, for controlling the signal processor 2 and the driver 3 based at least in part on a plurality of detection results by the detection circuit 63 and a plurality of target values stored in the memory 5*b*. The logic circuit 5*a* receives the detection signals SGb1, SGb2, Sgb3, and SGb4 from the detection circuit 64 through the ADC 5*c*, and separately outputs the amplitude control signal SGc1 to the signal processor 2 through the DAC 5*d* and the gain control signal Sgc2 to the driver 3 through the DAC 5*d*. The controller 5 generates the amplitude control signal SGc1 and the gain control signal Sgc2 based at least in part on the detection signals SGb1, SGb2, SGb3 and SGb4, and the target values Ti and Tv stored in the memory 5*b*.

The memory 5*b* stores three dimensional table data LUT3 (Lookup Table) that represents the dependence of the first target value Ti on both the temperature Th of the driver 3 and the supply voltage Vt of the driver 3. The logic circuit 5*a* receives the temperature detection signal SGb3 from the temperature detector 6*c* and calculates the temperature Th based on the temperature detection signal SGb3. The logic circuit 5*a* receives the voltage detection signal SGb4 from the voltage detector 6*d* and calculates the supply voltage Vt based on the voltage detection signal SGb4. The logic circuit 5*a* obtains the first target value Ti that corresponds to both the calculated temperature Th and the calculated supply voltage Vt according to the table data LUT3.

The controller 5 controls the signal processor 2 and the driver 3 for adjusting the second amplitude Voutpp to the second target value Tv and simultaneously restraining increase in power dissipation Pd. In the optical transmitter 1*d* according to the fourth embodiment of the present invention, the first target value Ti may be determined in accordance with both the temperature Th and the supply voltage Vt. The memory 5*c* stores the table data LUT3 that include a plurality of values of the temperature Th (temperature values), a plurality of values of the supply voltage Vt (voltage values) and a plurality of the first target values Ti. For each of the values of the supply voltage Vt, the first target values Ti corresponds to the values of the temperature Th one by one. Also, for each of the values of the temperature Th, the first target values Ti corresponds to the values of the supply voltage Vt one by one. Each number of the temperature values Th, the voltage values Vt, and the first target values Ti may be greater than 1. Note that a same value may be duplicated in the first target values Ti. The table data LUT3 is stored in the memory 5*b* in advance, for example based on measurement results of the supply current Ec.

The controller 5 may obtain the first target value Ti corresponding to both the temperature Th detected by the temperature detector 6*c* and the supply voltage Vt detected by the voltage detector 6*d* according to the table data LUT3 stored in the memory 5*b*. In a case that desired values Tpd(Th, Vt) of the power dissipation Pd are predetermined for combination of the values of the temperature Th and the values of the supply voltage Vt, where Tpd(Th, Vt) denotes a function of the temperature Th and the supply voltage Vt, the first target values Ti(Th, Vt) that constitute the table data LUT3 may be determined according a formula Ti(Th, Vt)=Tpd(Th, Vt)/Vt. For example, the desired values Tpd (Th, Vt) may be determined based on measurement results, which are acquired by measurement under the condition that the input voltage Vinpp is kept constant and the output voltage is kept constant (or the second target value Tv). More specifically, for example, the desired value Tpd(Th, Vt) may be determined for the each of the values of the supply voltage Vt so that at the maximum temperature Thmax the desired value Tpd(Th, Vt) becomes equal to a constant value Pca (for example 1.8 W) and at a temperature Th less than the maximum temperature Thmax the desired value Tpd(Th, Vt) becomes smaller than the constant value Pca.

Figure 12:
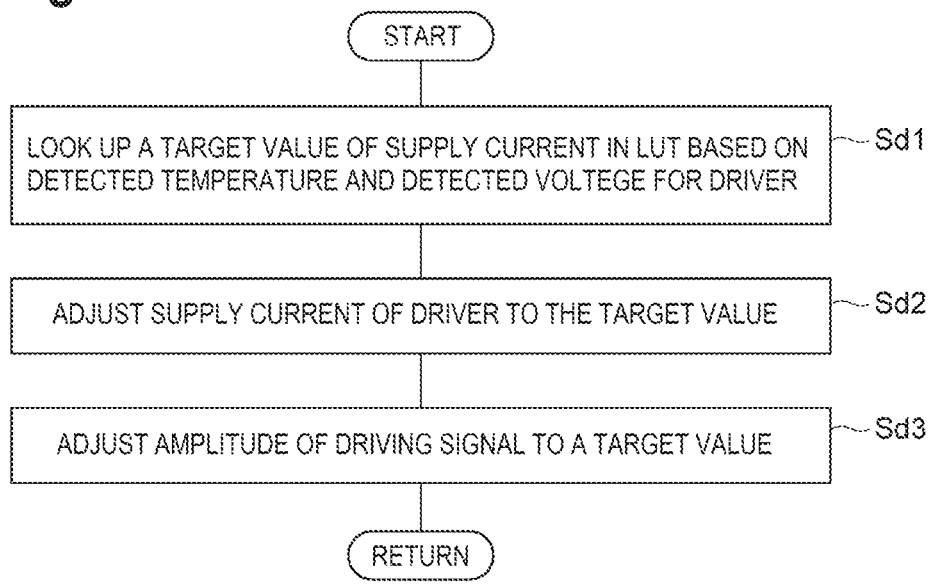
FIG. 12 is a flowchart which describes control operation for a driver in the optical transmitter according to the fourth embodiment of the present invention.

Next, control operation of the optical transmitter 1*d* according to the fourth embodiment of the present invention is described. FIG. 12 is a flowchart which describes control operation for the driver 3 in the optical transmitter 1*d* according to the fourth embodiment of the present invention. In the step Sd1, the controller 5 may obtain the first target value Ti(Th, Vt) corresponding to the detected temperature Th and the detected supply voltage Vt according to the table data LUT3. More specifically, the logic circuit 5*a* individually calculates the detected temperature Th from the temperature detection signal SGb3 and the detected supply voltage Vt from the voltage detection signal SGb4. Next, the logic circuit 5*a* may look up the first target value Ti(Th, Vt) corresponding to both the detected temperature Th and the detected supply voltage Vt in the table data LUT3. Then, the controller 5 performs the steps Sd2 for the first target value Ti(Th, Vt) and the step Sd3 for the second target value Tv. Because the steps Sd2 and Sd3 are respectively identical with the step Sa1 and Sa2 in FIG. 3 according the first embodiment of the present invention, the description of the steps Sc2 and Sc3 is omitted to avoid duplicating descriptions.

The effect of the optical transmitter 1*d* according to the fourth embodiment of the present invention may include the effect of the optical transmitter 1*b* according to the second embodiment of the present invention as shown in FIGS. 7A to 7C and the effect of the optical transmitter 1*c* according to the third embodiment of the present invention as shown in FIGS. 10A to 10D. Note that the effect of the optical transmitter 1*d* according to the fourth embodiment of the present invention may include different values and different lines from those of the effects shown in FIGS. 7A to 7A and 10A to 10D.

As described above, the optical transmitter 1*d* according to the fourth embodiment of the present invention may generate the temperature detection signal corresponding to the temperature Th of the driver 3 and the voltage detection signal SGb4 corresponding to the supply voltage Vt of the driver 3. The optical transmitter 1*d* may look up the first target value Ti based at least in part on the temperature detection signal SGb3 and the voltage detection signal SGb4 according to the table data LUT3 for adjusting the supply current Ec to the first target value Ti in accordance with the detected temperature Th and the detected supply voltage Vt. Therefore, in a case that the temperature Th and the supply voltage Vt may fluctuate, the optical transmitter 1d may obtain the first target value suitable for the temperature Th and the supply voltage.

The first target value Ti may be determined in advance so that a product of the supply voltage Vt and the first target value Ti become a desired value for each of the values of the temperature Th. In other words, the optical transmitter 1d may prepare a table data that represents the dependence of the first target value Ti on the temperature Th and the supply voltage Vt The optical transmitter 1d may obtain the first target value Ti corresponding to the temperature Th detected by the temperature detector 6c and the supply voltage Vt detected by the voltage detector 6d according to the table data. Thereby, the optical transmitter 1d may set the first target value Ti suitable for the temperature Th and the supply current Ec and reduce increase in the power dissipation Pd, when the temperature Th and/or the supply voltage Vt fluctuate. In a case where decrease in the supply current Ec adjusted to the first target value Ti causes decrease in the voltage gain Av, the optical transmitter 1d may increase the input voltage Vinpp (first amplitude) for compensating the degradation of the voltage gain Av and keeping the output voltage Voutpp (second amplitude) constant (or the second target value Tv). Accordingly, against fluctuation in both the temperature Th and the supply voltage Vt, the optical transmitter 1d may keep the output voltage Voutpp (second amplitude) constant (or the second target value Tv) and simultaneously reducing the power dissipation Pd.

What is claimed is:

1. An optical transmitter comprising:
   a signal processor configured to output a modulation signal having first amplitude;
   a driver configured to amplify the modulation signal for generating a driving signal, the driving signal having second amplitude, the driver consuming a supply current;
   a current detector configured to detect the supply current of the driver;
   an amplitude detector configured to detect the second amplitude of the driving signal; and
   a controller configured to control the driver based at least in part on a first result detected by the current detector for adjusting the supply current of the driver to a first target value, and configured to vary the first amplitude of the modulation signal based at least in part on a second result detected by the amplitude detector for adjusting the second amplitude of the driving signal to a second target value.

2. The optical transmitter of claim 1,
   wherein the current detector is configured to generate a current detection signal corresponding to the supply current of the driver,
   wherein the controller includes a comparator having a first input terminal and a second input terminal, the first input terminal receiving the current detection signal, the second input terminal receiving the first target value, and configured to generate a gain control signal based at least in part on a difference in voltage between the current detection signal and the first target value, and
   wherein the driver is configured to vary the supply current thereof and the second amplitude of the driving signal in accordance with the gain control signal.

3. The optical transmitter of claim 1, further including a temperature detector configured to detect a temperature of the driver,
   wherein the controller includes a lookup table that represents dependence of the first target value on the temperature, and refers the lookup table for obtaining the first target value corresponding to the temperature detected by the temperature detector.

4. The optical transmitter of claim 3,
   wherein the controller has the first target value set to be less a constant value, and increases the first amplitude of the modulation signal when the temperature increases, and decreases the first amplitude of the modulation signal when the temperature decreases, for keeping the second amplitude of the driving signal constant.

5. The optical transmitter of claim 1, further including a voltage detector configured to detect a supply voltage applied to the driver,
   wherein the controller includes a lookup table that represents dependence of the second target value on the supply voltage, and refers the lookup table for obtaining the first target value corresponding to the supply voltage.

6. The optical transmitter of claim 5,
   wherein the controller has the first target value for keeping power consumption of the driver less than a constant value, and increases the first amplitude of the modulation signal, when the supply current decreases, and decreases the first amplitude of the modulation signal, when the supply current increases.

7. The optical transmitter of claim 1, further including a temperature detector and a voltage detector, the temperature detector being configured to detect a temperature of the driver, the voltage detector being configured to detect a supply voltage applied to the driver,
   wherein the controller includes a lookup table that represents dependence of the first target value on the temperature of the driver and the supply voltage applied to the driver, and refers the lookup table for obtaining the first target value corresponding to both the temperature of the driver and the supply voltage applied to the driver.

8. A control method for an optical transmitter including a signal processor and a driver, the signal processor being configured to generate a modulation signal having first amplitude, the driver being configured to amplify the modulation signal for generating a driving signal having second amplitude, the control method comprising:
   detecting a supply current of the driver for outputting a detected current value;
   controlling the driver for adjusting the detected current value to a first target value;
   detecting the second amplitude of the driving signal for outputting a detected amplitude value; and
   controlling the signal processor for adjusting the detected amplitude value to a second target value.

9. The control method of claim 8,
   wherein the controlling the signal processor includes varying the first amplitude of the modulation signal for varying the second amplitude of the driving signal.

10. The control method of claim 9, further including:

detecting temperature of the driver for outputting a detected temperature value; and setting the first target value in accordance with the detected temperature value.

11. The control method of claim 9, further including:

detecting a supply voltage applied to the driver for outputting a detected voltage value; and setting the first target value in accordance with the detected voltage value.

12. The control method of claim 11, wherein the setting the first target value in accordance with the detected voltage value includes:

increasing the first target value when the detected voltage value increases in comparison with a previous value thereof; and decreasing the first target value when the detected voltage value decreases in comparison with the previous value thereof.

13. The control method of claim 9, further including:

detecting temperature of the driver for outputting a detected temperature value; and detecting a supply voltage applied to the driver for outputting a detected voltage value; and setting the first target value in accordance with the detected temperature value and the detected voltage value.

14. A control method of an optical transmitter including a driver that amplifies an input signal having first amplitude for generating a driving signal having second amplitude, the control method comprising:

detecting a supply current of the driver for outputting a detected current value;

controlling the driver such that the detected current value becomes a first target value;

detecting the second amplitude of the driving signal for outputting a detected amplitude value; and varying the first amplitude such that the detected amplitude value becomes a second target value.

* * * * *